W. S. MORTON.
AXLE HOUSING AND FIFTH WHEEL CONSTRUCTION FOR MOTOR TRUCKS.
APPLICATION FILED OCT. 30, 1915.

1,342,861.

Patented June 8, 1920.
3 SHEETS—SHEET 1.

Witnesses:
Wm H Hawkins
F. D. Ammen

Inventor
Walter S. Morton
By his Attorneys
Meyers, Cushman & Rea

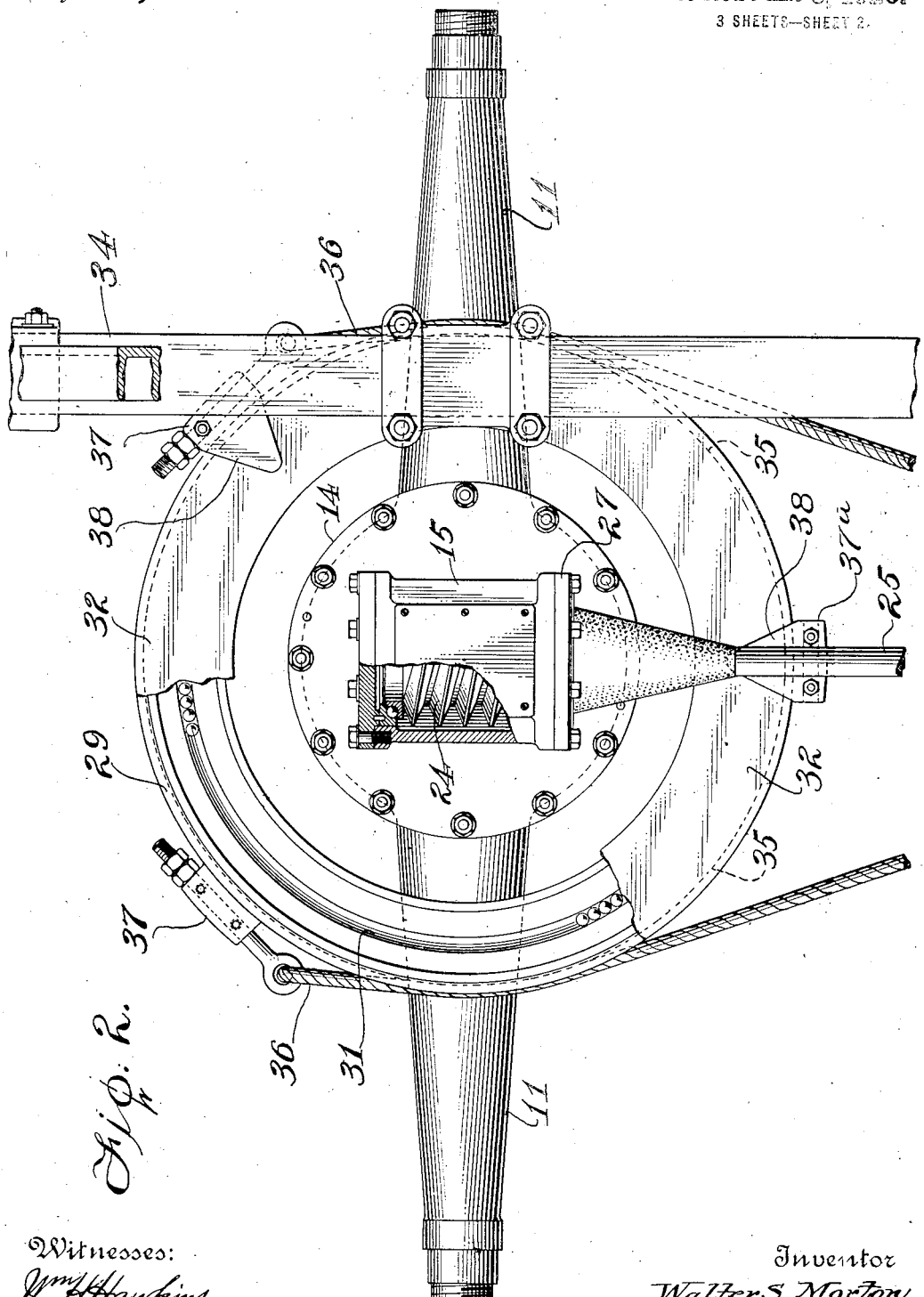

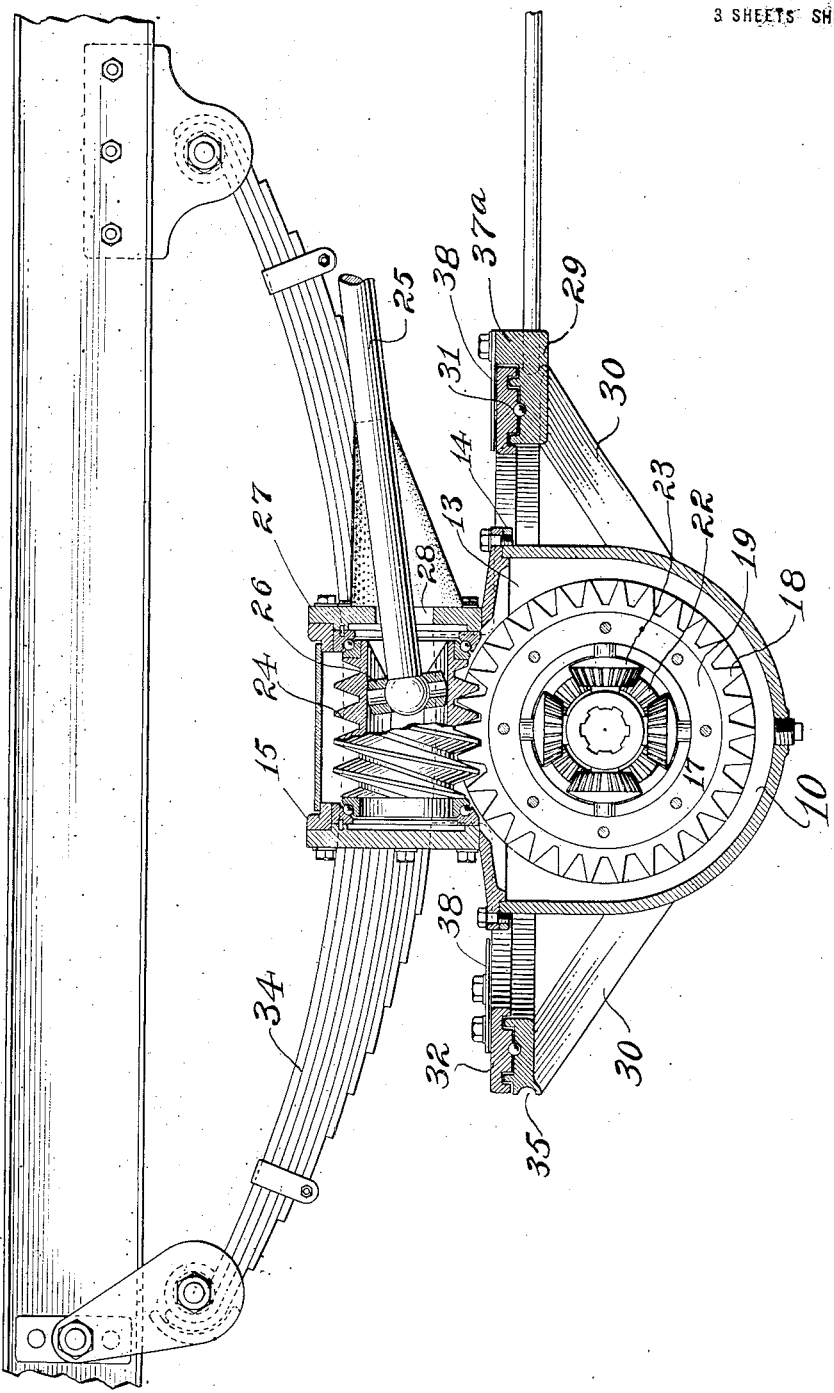

UNITED STATES PATENT OFFICE.

WALTER S. MORTON, OF HARRISBURG, PENNSYLVANIA.

AXLE-HOUSING AND FIFTH-WHEEL CONSTRUCTION FOR MOTOR-TRUCKS.

1,342,861.  Specification of Letters Patent.  Patented June 8, 1920.

Application filed October 30, 1915. Serial No. 58,826.

*To all whom it may concern:*

Be it known that I, WALTER S. MORTON, a citizen of the United States, residing at Harrisburg, in the county of Dauphin and State of Pennsylvania, have invented new and useful Improvements in Axle-Housings and Fifth-Wheel Construction for Motor-Trucks, of which the following is a specification.

This invention relates to motor vehicles and particularly to the housings of their axles. The invention is particularly applicable to heavy motor cars or trucks of a type in which the axle swings on a substantially vertical axis at its middle point in steering the vehicle and in which a driving connection to the axle is made at a point on or about on this axis of rotation.

A principal object of the invention is to produce an axle housing which is very simple in construction and which very effectively houses the necessary driving parts, and at the same time enables the axle to have the swinging movement suggested above which is necessary for steering the car.

Further objects of the invention will appear more fully hereinafter.

The invention consists in the general combination of parts and details hereinafter described, all of which contribute to produce an efficient axle housing.

A preferred embodiment of my invention will be particularly described in the following specification while the broad scope of my invention will be pointed out in the appended claims.

In the drawings,

Fig. 2, is a plan of the axle housing with the parts carried thereby removed but showing partly broken away the upper ring of the fifth-wheel which is constructed upon the housing.

Fig. 3, is a vertical transverse section taken through the middle of the housing and indicating the gearing and other parts. This view also illustrates parts of the driving gearing for driving the differential.

Figure 1:
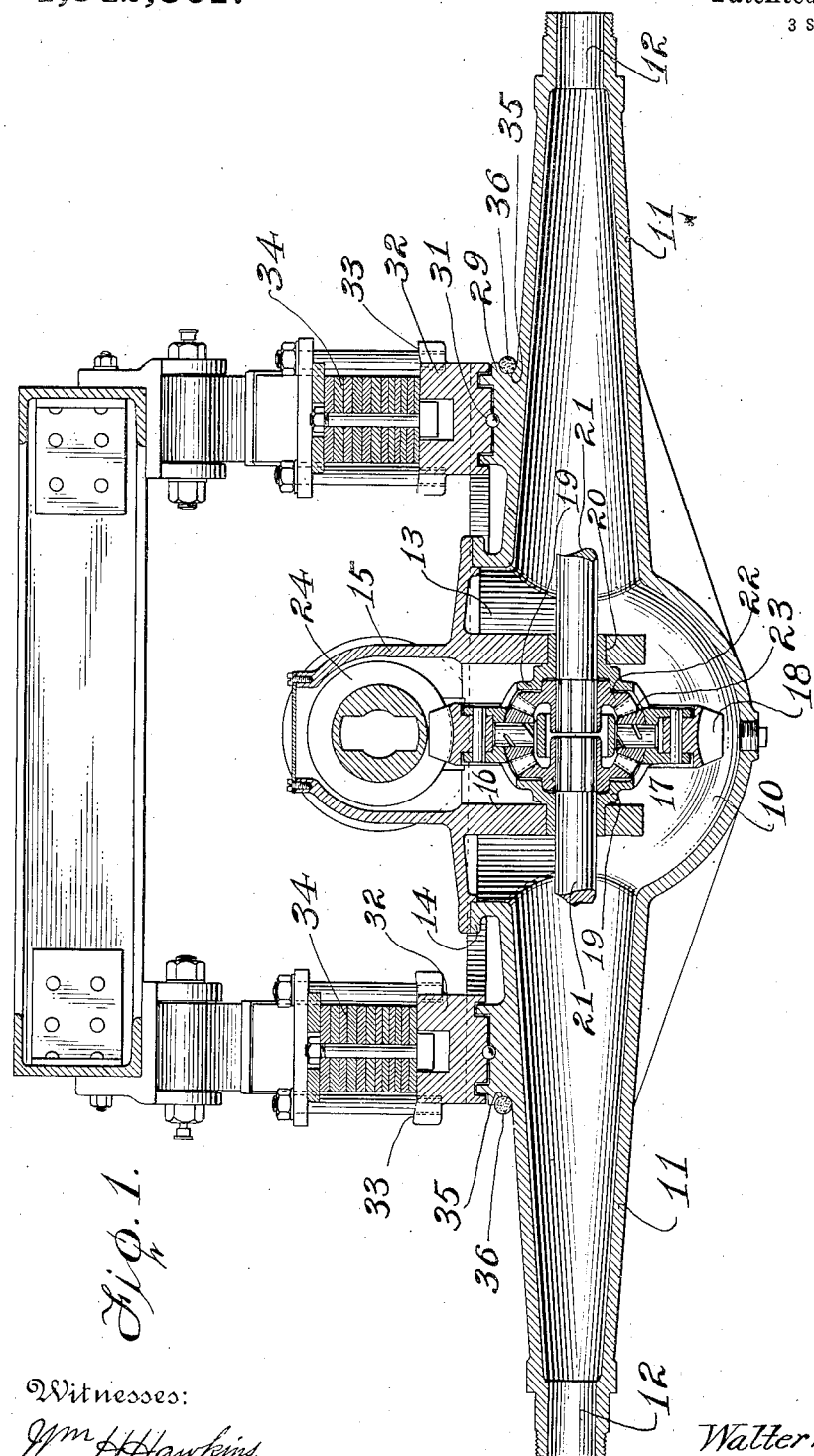
Figure 1, is a longitudinal section through an axle housing embodying my invention and showing, by way of example, an axle and driving gear therefor supported in the housing. This view also illustrates the manner in which the vehicle body is supported upon the axle.

Before proceeding to a detailed description of the housing, it is understood that in practice one or preferably two of these housing and axle constructions are employed under a truck so as to enable it to be steered readily and at the same time permit a driving connection to be made in a simple manner through the axis about which the axle swings in steering.

The housing preferably comprises an enlarged middle portion 10 which is preferably in hemispherical or bowl shape and from this middle portion substantially tubular extensions 11 project in opposite directions, said extensions being preferably slightly tapered and provided at their outer ends with bores 12 which enable the housing to receive the axle of the vehicle.

The enlarged middle portion 10 is preferably provided on its upper side with an enlarged opening 13, the edge of which may be provided with a suitable flange 14 to facilitate the securing in place of a gear housing 15. This gear housing seats upon and closes the opening, and in addition to its function of housing a driving gear for transmitting motion to the axle, it also operates to assist in supporting the axle. For this purpose, it is preferably provided with two downwardly disposed extensions 16 to receive the axle. Providing two such extensions 16 particularly adapts the gear housing 15 to be used with the type of driving gear which I have chosen to illustrate in the present embodiment of the invention.

In this instance, this driving gear consists of a differential 17, the main wheel of which is a worm wheel 18 in the form of a rim to which two hubs or disks 19 are attached, said disks 19 being formed with naves 20 which operate as bearing supports for the axle 21. This axle, in the present instance, is illustrated as formed in two sections, each section corresponding to one of the wheels and driven respectively by their corresponding beveled gears 22 meshing with the driving pinions 23 of the differential. The gear such as worm wheel 18 in the present embodiment may be driven by means of a gear such as worm 24, mounted in the aforesaid gear housing 15. This worm 24 is mounted so as to be rotated continuously, when the motor is running, and motion is transmitted to the gear by a rotating drive rod 25 which is driven by the motor and which has a pin and slot and sliding connection 26 with the interior of the worm.

The cover plate 27 at the end of the gear housing 15, through which the rod 25 extends, has an elongated slot 28 which permits considerable relative swinging movement of the rod 25 with respect to the longitudinal axis of the worm. This feature renders the axle housing and the axle capable of a considerable swinging movement in steering and at the same time maintains a driving connection with the axle.

To enable the axle to swing in steering, I prefer to provide a fifth-wheel which is carried upon the axle and this is preferably accomplished by means of a fifth-wheel member or ring 29 which is supported on the tubular extensions 11 at two diametrically opposite points on the ring, and preferably also at intermediate points by means of substantially radial arms 30 which connect the ring with the enlarged portion 10 of the housing.

In practice, I prefer to form this ring 29 integrally with the housing, and the ring is preferably located just above the upper side of the tubular extensions 11 and slightly beyond the flange 14. The fifth-wheel is preferably in the form of a ball-bearing and hence the upper side of this ring 29 has a ball race 31 upon which seats an upper ring 32. This upper ring is simply an annular member grooved on its under side so as to form a ball race and also so as to make a tongue and groove connection with the lower ring to prevent dislodgment of the upper ring by lateral forces exerted in a substantially horizontal plane.

On its upper side, the upper ring 32 is provided with suitable means, such as saddles or seats 33 to which the springs 34 of the vehicle may be attached by suitable clips. The outer side of the lower ring 29 is preferably formed with means for guiding a steering cable 36 preferably in the form of a groove 35, which cables are anchored at their ends in suitable lugs 37 which project out from the ring 29. Evidently, if one of the cables is taken up and the other paid out the axle housing will be rotated at the fifth-wheel.

In case the motion of the vehicle should tend to lift the body off the axle, I prefer to provide keepers preferably in the form of clips or plates 38 which are attached to the lower ring 29 and project over the upper ring 32. In the present embodiment, I have illustrated two of these plates as attached to a special lug 37ª at an intermediate point on the ring.

An axle housing such as described may be used for either the front or rear axle or for both axles if desired.

Evidently, if the axle 21 is removed, the gear housing 15 may then be removed, bringing with it all the differential gearing, which it supports.

It is understood that the embodiment of the invention set forth herein is only one of the many embodiments or forms the invention may take, and I do not wish to be limited in the practice of the invention nor in my claims to the particular embodiment set forth.

What I claim is:

1. An axle housing for motor vehicles, having an enlarged middle portion to house parts of the driving gearing for the axle and having reduced substantially tubular extensions on opposite sides of said enlarged portion to house the axle, and a fifth wheel ring supported on said substantially tubular extensions at diametrically opposite points on said ring and connected at intermediate points with said enlarged portion.

2. An axle housing for motor vehicles, having an enlarged middle portion to house parts of the driving gearing for the axle and having reduced substantially tubular extensions on opposite sides of said enlarged portion to house the axle, and a fifth wheel ring connected integrally with said tubular extensions and having integral connections with said enlarged portion at intermediate points on said ring.

3. An axle housing for motor vehicles, having an enlarged middle portion to house parts of the driving gearing for the axle and having reduced substantially tubular extensions on opposite sides of said enlarged portion to house the axle, said enlarged portion having an opening on its upper side, a gear housing to house other driving gear parts, attached to said enlarged portion, closing said opening, and a fifth wheel ring supported at two substantially diametrically opposite points by said tubular extension and having substantially radial arms at intermediate points connecting said ring with said enlarged portion.

4. An axle housing for motor vehicles, having an enlarged middle portion to house parts of the driving gearing for the axle and having reduced substantially tubular extensions on opposite sides of said enlarged portion to house the axle, said enlarged portion having an opening on its upper side, a gear housing to house other driving gear parts, attached to said enlarged portion, closing said opening, and a fifth wheel ring supported at two substantially diametrically opposite points by said tubular extensions and having substantially radial arms at intermediate points connecting said ring with said enlarged portion, said ring having means for circumferentially guiding and anchoring a steering cable thereupon.

5. An axle housing for motor vehicles, having an enlarged middle portion to house parts of the driving gearing for the axle and having reduced substantially tubular extensions on opposite sides of said enlarged portion to house the axle, said enlarged portion having an opening on its upper side, a gear housing to house other driving gear parts, attached to said enlarged portion, closing said opening, and a fifth wheel ring supported by said axle housing and provided with means for circumferentially guiding and anchoring a steering cable thereupon.

In testimony whereof I have hereunto set my hand in presence of two subscribing witnesses.

WALTER S. MORTON.

Witnesses:
A. C. WHALEN,
FRANK W. LYON.